United States Patent
Solari et al.

(10) Patent No.: US 8,781,912 B2
(45) Date of Patent: Jul. 15, 2014

(54) COMPUTER-BASED METHOD AND COMPUTER PROGRAM PRODUCT FOR SETTING FLOOR PRICES FOR ITEMS SOLD AT AUCTION

(75) Inventors: Soren Solari, San Diego, CA (US); Jacob Spoelstra, Carlsbad, CA (US); Craig Nies, Carlsbad, CA (US)

(73) Assignee: Opera Solutions, LLC, Jersey City, NJ (US)

( * ) Notice: Subject to any disclaimer, the term of this patent is extended or adjusted under 35 U.S.C. 154(b) by 305 days.

(21) Appl. No.: 13/048,402

(22) Filed: Mar. 15, 2011

(65) Prior Publication Data

US 2012/0239582 A1      Sep. 20, 2012

(51) Int. Cl.
*G06Q 30/00*     (2012.01)
*G06Q 30/08*     (2012.01)

(52) U.S. Cl.
CPC ................................. *G06Q 30/08* (2013.01)
USPC ........................................................ 705/26.3

(58) Field of Classification Search
CPC .................................................... G06Q 30/08
USPC ............... 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS

| | | | |
|---|---|---|---|
| 6,415,270 B1 * | 7/2002 | Rackson et al. | 705/36 R |
| 6,697,800 B1 | 2/2004 | Jannink | |
| 7,493,280 B2 * | 2/2009 | Guler et al. | 705/37 |
| 2002/0116281 A1 | 8/2002 | Costello | |
| 2003/0055773 A1 | 3/2003 | Guler | |
| 2003/0069740 A1 * | 4/2003 | Zeidman | 705/1 |
| 2004/0254800 A1 | 12/2004 | Saunders | |
| 2007/0185906 A1 | 8/2007 | Humphries | |
| 2008/0215497 A1 | 9/2008 | Dillon | |
| 2008/0221948 A1 | 9/2008 | Eglen | |
| 2010/0070343 A1 * | 3/2010 | Taira et al. | 705/10 |
| 2010/0070344 A1 * | 3/2010 | Taira et al. | 705/10 |

OTHER PUBLICATIONS

Greg Welch et al. "An Introduction to the Kalman Filter" Department of Computer Science, University of North Carolina at Chapel Hill, Jul. 24, 2006.*

(Continued)

*Primary Examiner* — Naeem Haq
(74) *Attorney, Agent, or Firm* — McCarter & English, LLP (57) ABSTRACT

An adaptive method for estimating the selling price for an item at auction in order to set a reserve. The method calculates the selling price as a function of selling prices for items previously-sold at auction and differential values attributable to feature differences between the item to be sold and comparative items previously sold. Distance metrics are calculated by comparing the item to be sold with each item in the set of comparative items, and a subset of most similar items is selected according to the calculated distance metrics. A weighting function is then calculated for each item in the subset based on its respective distance metric value, and the selling price is estimated as a function of the weighting functions and the differential values. The differential values are modeled as a linear dynamical system and updated using a Kalman filter as a function of an actual sales price for the item to be sold and a current estimate of uncertainty for the differential values.

29 Claims, 8 Drawing Sheets

(56) References Cited

OTHER PUBLICATIONS

Ramsey Faragher "Understanding the Basis of the Kalman Filter via a Simple and Intuitive Derivation", IEEE Signal Processing Magazine, pp. 128-132, Sep. 2012, 1053-5888/12/$31.00 © 2012IEEE.*

The International Search Report and Written Opinion by the International Searching Authority, mailed on Jun. 25, 2012, in the related PCT application No. PCT/US12/29280.

\* cited by examiner

COMPUTER-BASED METHOD AND COMPUTER PROGRAM PRODUCT FOR SETTING FLOOR PRICES FOR ITEMS SOLD AT AUCTION

FIELD OF THE INVENTION

The present application is directed to a computer-based, adaptive method for determining a "floor" or "reserve" selling price for an item to be sold at auction as a function of historical sales data for comparable items, and more particularly, to a computer-based method for determining a reserve selling price as a function of predicted differences in value between the item to be sold and a set of most similar items of the same type previously sold according to features of the items.

BACKGROUND OF THE INVENTION

Auctions are often used as a means for selling significant inventories of items held by a seller. For example, a typical manufacturer of vehicles such as a major automobile manufacturer may over time accumulate a large number of excess vehicles, including fleet (ex-rental) vehicles, retail vehicles, company vehicles, off-lease vehicles, and the like. The manufacturer may seek to sell many of these excess vehicles at auction, with the objective of obtaining a fair market value (or otherwise "best price") for each vehicle sale.

At auction, an auctioneer will typically solicit bids for each vehicle from a group of bidders, and submit the highest bids to the manufacturer for consideration. The manufacturer is generally not obligated to accept any of the offered bids. For example, if the manufacturer determines that the highest bid for a vehicle does not reach what the manufacturer believes to be a fair market value for a particular vehicle at the time of auction, the manufacturer may alternatively elect to sell the vehicle at another time and at another auction.

At each auction, the manufacturer will generally provide a field representative responsible for making a sales decision for each used vehicle that the manufacturer is auctioning. Typically, each vehicle is bid within about 30-45 seconds, after which time the field representative is required to quickly decide whether to "sell" or "no-sell" the vehicle.

In order to assist the representative in quickly reaching a decision, the manufacturer may establish a "floor" or "reserve" price for each vehicle. The reserve price represents the manufacturer's best estimate of a fair market value for the vehicle, and may be used by the manufacturer according to rules of the auction to set a minimum acceptable price for selling the vehicle.

In order to predict fair market value, a number of third-party valuations of vehicles may be available to manufacturers (i.e., so-called "black-book" evaluations). Unfortunately, black-book valuations are often limited in their ability to adjust prices based on the details of features provided in individual vehicles, and are only infrequently updated (for example, quarterly or annually) to reflect historical vehicle selling prices. As a result, floor price predictions using these third-party valuations are often outdated and inaccurate, and present manufacturers with a significant risk of lost revenue as a consequence of sales made below true fair market value.

SUMMARY OF THE INVENTION

The present invention is directed to a computer-based method and computer program product for setting a fair market value selling price ("reserve" or "floor" price) for an item at auction. The method relies on historical auction sales data, and calculates the selling price as a function of selling prices for previously-sold items of the same type adjusted according to differential values attributable to differences between specific features of the item to be sold and the previously-sold items.

In a preferred embodiment of the method, price-affecting features are first determined for a specified item, and values for a distance metric are calculated by evaluating the differential price effects of the price-affecting features ("state variables") for the item to be sold and each item in a relevant set of previously-sold comparative items. Then, a subset of most similar items among the comparative items is selected according to the calculated distance metrics. For example, the subset may be selected as the set of all items having a distance metric value falling below a specified threshold. Alternatively, the subset may be selected as a specified number of items selected in rank order beginning with the item having a lowest distance score and proceeding toward the item having the largest distance score.

A weighting function is calculated for each item in the subset of most similar items as a function of the inverse of its respective distance metric, and the fair market selling price is estimated as a function of the weighting functions as applied to state variables characterizing the differential values for each of the subset of most similar items. After the item is sold, the state variables are updated as a function of the actual sales price and a current estimate of uncertainty for the differential values expressed by the state variables. Updating of the state variables is preferably carried out by a specific application of an algorithm known as the Kalman filter equations. A database storing the historical auction sales data is also updated with sales information for the item just sold, the updated state values and data for applying the Kalman filter equations.

The features used to compute the reserve or floor price may be expressed by either or both of numerical values or categorical values, with no restriction on the number of features used. Typically, these features are selected a priori by a seller having particular knowledge relating to items of the type being sold.

BRIEF DESCRIPTION OF THE DRAWINGS

The invention will become more readily apparent from the Detailed Description of the Invention, which proceeds with reference to the drawings, in which.

DETAILED DESCRIPTION OF THE INVENTION

Reference will now be made in detail to exemplary embodiments of the invention, including the best modes contemplated by the inventors for carrying out the invention. Examples of these exemplary embodiments are illustrated in the accompanying drawings. While the invention is described in conjunction with these embodiments, it will be understood that it is not intended to limit the invention to the described embodiments. Rather, the invention is also intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In other instances, well-known aspects have not been described in detail in order not to unnecessarily obscure the present invention.

For the purpose of illustrating the present invention, an exemplary embodiment is described with reference to an auction of vehicles (automobiles) by a manufacturer. It should however be recognized that the invention as claimed may just as easily be applied to and illustrated by applications concerning any variety of other items that may be sold by auction (for example, applications concerning industrial equipment, equity instruments and livestock lots as are further described infra herein).

In this specification and the appended claims, the singular forms "a," "an," and "the" include plural references unless the context clearly dictates otherwise. Unless defined otherwise, all technical and scientific terms used herein have the same meaning as commonly understood to one of ordinary skill in the art to which this invention belongs.

General Considerations for Determining the Floor Price of a Vehicle

Developing an accurate prediction of the floor price of a vehicle is non-trivial problem, as many varied factors may influence the floor price. At a high level, these factors may for example include:

vehicle-specific factors: factors that are determined with reference to a specified vehicle, and may include vehicle-specific properties—for example, vehicle manufacturer, make, model, year of manufacture, feature options (for example, trim), vehicle mileage, vehicle condition (including, for example, apparent damage), vehicle color, vehicle identification number (VIN), engine option and fuel performance in miles per gallon (mpg), and a variety of other numerically or categorically expressed features that may be conventionally used to characterize a specific vehicle, auction properties: the location of sale of this specific vehicle, and the sale date of this specific vehicle, and non-vehicle specific factors: factors that may affect the sale price of vehicles and are not directly related to a specific vehicle, for example including: current fuel prices, general economic factors (for example, consumer confidence, consumer sentiment, unemployment, housing prices, stock market, and the like), weather events, news events and the like.

By way of example, Table I provides a preferred list of factors to be considered in modeling reserve price for a vehicle, including an associated data type ("factor type") indicating a data storage mode. This list was assembled, for example, based on (1) vehicle data available for collection and (2) expert judgment. The list was further refined through experimentation and re-evaluation:

TABLE I

| Factor Description | Factor Type |
| --- | --- |
| Date of vehicle attempted/successful sale | Date |
| Auction Identifier where vehicle is/was sold | Integer |
| Vehicle model | String |
| Model year | Integer |
| Vehicle trim description, eg. XL | String |
| Drive train description, eg. 4WD | String |
| Body style description, eg. Coupe | String |
| Transmission description, eg. Auto | String |
| Vehicle color code | String |
| Damage amount | Integer |
| Mileage | Integer |
| Vehicle grade (1-5) | Integer |
| Manufacturer's suggested retail price (MSRP) for original vehicle | Integer |
| Source of vehicle, lease/fleet/credit/company/etc. | String |
| Indicator if vehicle has previously been sold | Boolean |
| Indicator of whether the vehicle was sold or not at this event date | Boolean |
| Frame damage indicator | Boolean |
| List of all manufacturer options on vehicle (List of codes with separator, eg. A01: B12: B23) | String |
| True Mileage Unknown indicator | Boolean |
| Vehicle buy-back indicator | Boolean |
| Normal wear and tear amount | Integer |
| Auction type code, eg. closed/open/etc. auction | String |
| Repossession indicator | Boolean |
| Final sale price (if sold) | Integer |
| VIN of vehicle | String |

Typically, the seller of a vehicle will be able to directly observe and/or control the vehicle specific factors, while the non-vehicle specific factors, being unrelated to any specific vehicle, may be uncontrollable, unobservable and/or unknown.

In a floor or reserve price model developed in accordance with principles of the present invention, it is assumed that two identical vehicles (in terms of their vehicle specific factors) should effectively share the same fair market value. With this premise in mind, a model developed in accordance with principles of the present invention estimates the difference in price between two vehicles as a function of the price differences attributable to the differences in the features of the vehicles, plus some random fluctuation (noise). Assuming that the actual sale price of a first one of the two vehicles is a suitable proxy for its fair market value, the fair market value of a second vehicle can be determined as a function of the actual sale price of the first vehicle and the functional differences between the two vehicles. Significantly, and as further illustrated below, the effects of relevant non-vehicle specific factors may be implicitly captured in the differences measured among the vehicle-specific factors.

By way of example, consider fuel price as a non-vehicle specific factor which can affect the value of a vehicle. Although fuel price is a factor admittedly not significantly influenced by characteristics of a particular vehicle, an effect of fuel price may never-the-less influence a financial impact for a vehicle-specific feature (for example, a price difference according to fuel performance in mpg).

By comparing the market value of two vehicles having a common value for a vehicle-specific factor (e.g., mpg) that is related to a common non-vehicle factor (e.g., fuel price), the non-vehicle factor can essentially be "normalized" in the sense that it presents no effect on price difference for the two vehicles sharing a common value for the related vehicle-specific feature. Therefore, by comparing sufficiently similar vehicles (at least with respect to vehicle-specific features that are related to non-vehicle specific features), the effects of the non-vehicle specific features can be normalized (or otherwise minimized) such that they have essentially no effect on the operation of the model. As the effects for many non-vehicle specific features may be unknown or otherwise difficult to estimate, this aspect of the present invention is significant.

According to principles of the present invention, a fair market value price model as disclosed herein predicts that "identical" vehicles will have the same fair market value. In order to qualify as being identical, inter alia, the time and location of sale for each vehicle must be coincident. Since no two vehicles can be sold at precisely the same time in the same place, no two vehicles will ever be completely identical. This limitation, however, does not prevent effective application of the fair market value price model.

Applicants note that when the volume of vehicle sales is large (for example, at or above 1000 vehicles per month) and vehicles are sold on a daily, hourly or even per minute basis, vehicles can be compared with each other within a reasonably short time period (for example, within a 50-day window) so long as the final sale prices are available. A comparison however may be reasonably made based on only one other comparable sale during the time period. This is possible for the following reason.

Non-vehicle specific factors are most often economic factors that change at a much slower rate than the rate at which vehicle are sold. Therefore, by comparing the vehicle to be sold with previously-sold vehicles all sold recently (for example, within the 50-day window), the changes due to these non-vehicle specific factors are negligible, and as a result, the effects can readily be normalized. Even if there is an abrupt change in value for a non-vehicle specific factors that significantly affects fair market value, Applicants observe that the change can be quickly normalized by limiting comparisons of the vehicle to be sold to the most recent vehicle sales occurring after the abrupt change, because these most recent sales will have incorporated the abrupt changes implicitly.

Applicants further observe that the function of differences between vehicles is in general non-linear. For example, for two randomly-selected vehicles having varying trim options, mileage, vehicle condition, other options, color, and location of sale, the varying factors may interact in ways that are not accurately modeled as an independent linear sum of the apparent differences. However, by restricting the analysis to a comparison of "most" similar vehicles (as described further herein), Applicants have determined that the analysis can be transformed into a domain where the differences are nevertheless reasonably linear. A key therefore to the analysis carried out in accordance with principles of the present invention is in the selection of substantially similar vehicles (both in features and in time) for comparison, so that non-linear interactions among factors are minimized or otherwise muted, and so that the analysis, in essence, is "linearized."

Model for Determining the Floor Price of a Vehicle

Figure 1:
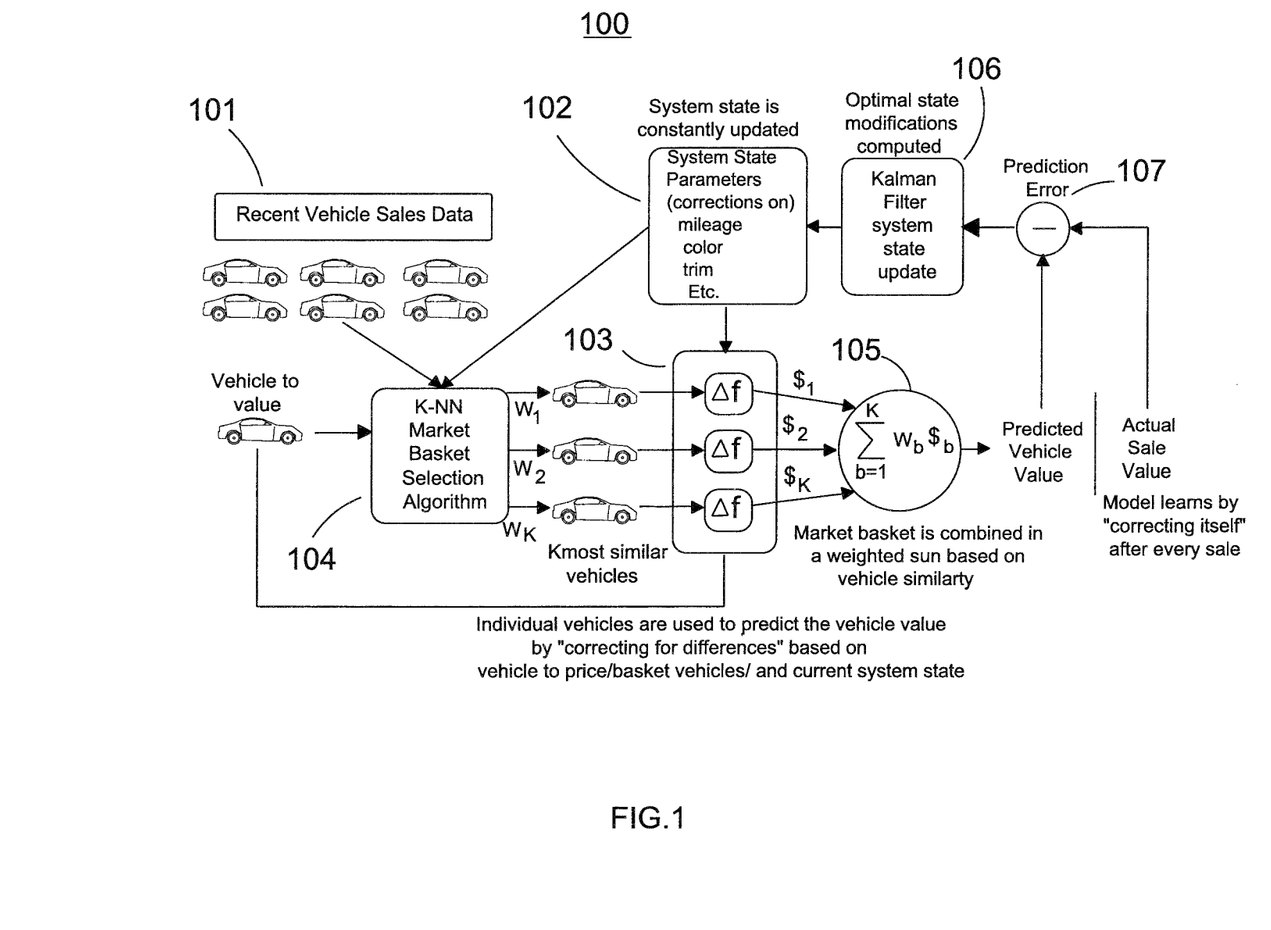
FIG. 1 presents a graphical depiction of a method for determining a fair market price for a vehicle according to principles of the present invention.

FIG. 1 presents a graphical depiction of a method 100 for determining a fair market price for a vehicle according to principles of the present invention. An exemplary process 200 for computing the fair market price according to the method depicted in FIG. 1 is further illustrated by a flow diagram present in FIG. 2.

Figure 2:
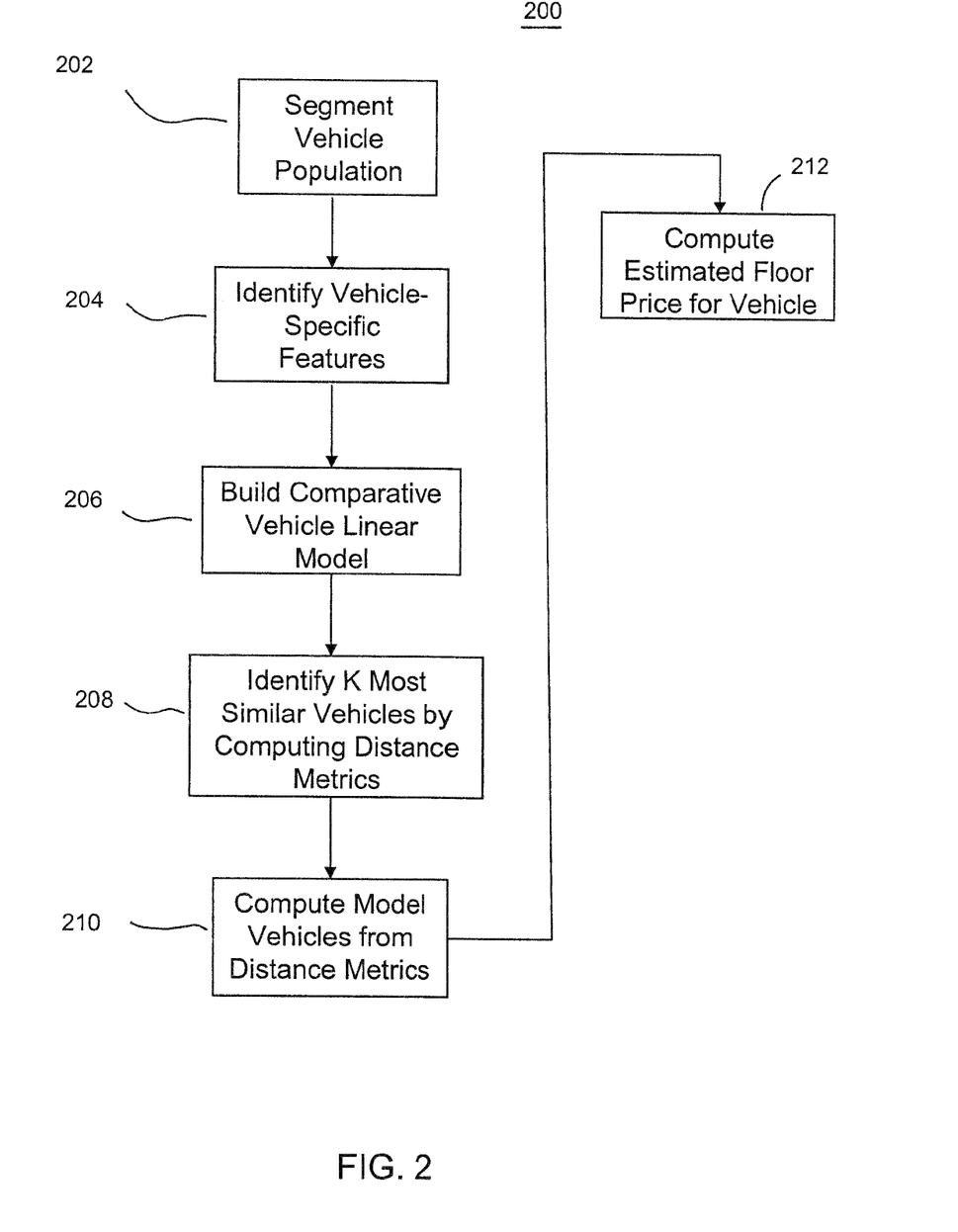
FIG. 2 presents a flow diagram illustrating a process for computing the fair market price according to the method depicted in FIG. 1.

At step 202 of FIG. 2, the process 200 begins with a segmentation of the vehicle population into "homogenous" model groups. For example, a preferred vehicle segmentation may group vehicles according to model and production year. However, one of ordinary skill in the art will realize that many other segmentations may also be suitable, provided that the segmentations provide a reasonable number of data samples of vehicles sold at substantially the same time (for example, 1000 or more) in order to adequately enable normalization of non-vehicle specific features as described above.

At step 204, appropriate vehicle-specific features are identified and selected for determining the differences in value between vehicles. This step is further depicted in FIG. 1 by functional element 102. Selected features may be characterized numerically or categorically. In the case of numerical features, for example, each feature will preferably be defined as having a single numerical value (e.g., dollars ($)/accumulated miles). In the case of categorical features, such as the category of vehicle options, each unique feature in the category becomes an independent binary feature of the vehicle (i.e., is either present or absent from the vehicle, with an associated dollars ($) differential effect).

At step 206, a linear dynamical system (LDS) model is created to express a state of the system for evaluating the fair market value of the vehicle. This step is further depicted in FIG. 1 by functional elements 103-105. The state of the model is preferably prepared as a vector of parameters (each expressed, for example, as dollars ($)/feature) for the vehicle. Numerical feature values are inherently expressed as being multiplicative and continuous, for example, as in $/mile* (value difference according to accumulated vehicle mileage) or dollars ($)/day*(value difference according to accumulated days between sales). Categorical feature values are inherently binary, are therefore are preferably prepared with discrete values (expressed, for example, as dollars ($)/color_white or dollars ($)/option_A). Thus, if two vehicles evaluated using the model share an identical binary feature, then there is no difference with respect to the feature, and therefore no contribution to a difference in valuation made by that feature.

For purposes of further illustrating principles of the present invention, an exemplary LDS model is now disclosed. The model is used to compute a fair market value $V_{ab}$ for a vehicle "a" as compared to a value expressed by a recent sale of a vehicle "b" In this model, $F_{aj}$, indicates the value of a feature j with reference to the vehicle a, and $x_j$ is a state variable providing a measure of an associated monetary value for the feature (dollars ($)/$F_1$). The feature "vehicle value," is set to 0 for vehicle "a", while the vehicle value of "b" is set at an actual sale price for the vehicle "b." The associated monetary value for feature "vehicle value" is fixed at 1. In this case, the model effectively makes corrections to the actual sale price of vehicle "b" based on the differences between features of the vehicles. Mathematically, the price is expressed as:

$$V_{ab} = \sum_{\forall j} (F_{aj} - F_{bj}) x_j \qquad [1]$$

At step 208 of the process 200 of FIG. 2, a "K nearest neighbor" ("K-NN") analysis is performed to identify the K most similar vehicles to the vehicle "a" according to the recent past sales data (as depicted by functional elements 101 and 104 in FIG. 1). The analysis is preferably performed as follows. A distance metric, $D_{ab}$, measuring a level of difference between vehicle "a" and vehicle "b," is defined as a sum of absolute value of the dollars ($) differences between the vehicles for each vehicle-specific feature (where the vehicle value is excluded), expressed as:

$$D_{ab} = \sum_{\forall j \neq value} |(F_{a_j} - F_{b_j})x_j| \quad [2]$$

Several related parameters may preferably be used in conjunction with the distance metric to select the K nearest neighbors. For example, a distance threshold ("Kmax") may be empirically determined to ensure a reasonable distribution of similar vehicles are used in the pricing calculation, and applied so that those vehicles having a distance from vehicle "a" above the threshold Kmax are not considered. Alternatively, Kmax may be set to define a maximum number of vehicles, so that only the Kmax most similar vehicles are selected. Kmax may be determined empirically to be sufficiently large to ensure accurate calculations without requiring inordinate processing times. As yet another alternative, a minimum Kmin may be set (for example, at 8 vehicles) so that, if there are fewer than Kmin vehicles kept as a result of applying the distance threshold, then the distance threshold is ignored and the Kmin most similar vehicles are used as neighbors.

A unique and beneficial property of this model is that the distance metric is dynamic, because it is a function of current estimates $x_j$ of the states of the system. As the estimates $x_j$ over time provide increasingly accurate predictions for fair market value of specific vehicle attributes, the distance metrics used in the K-NN selection algorithm also improve to more accurately select the most similar vehicles to the vehicle "a," thereby further "linearizing" the model as earlier described for improved accuracy.

Once the distances $D_{ab}$ are computed, a weighted sum of K predicted values is prepared to calculate a fair market value $P_a$ for the vehicle "a" (steps 210 and 212 of FIG. 2, and element 105 of FIG. 1) in comparison to each of the Kmax or Kmin most similar vehicles. The weighted sum may preferably be calculated by preparing weight $w_b$ proportional to the inverse of the distance $D_{ab}$, to be applied to a comparative price $V_{ab}$ calculated for each vehicle "b" among the K most similar vehicles:

$$P_a = \sum_{b=1}^{K} w_b V_{ab}, \quad [3]$$

$$\text{where } w_b \propto \frac{1}{D_{ab}}$$

Specifically, the computation of $w_b$ may take the following form:

$$\alpha_b = \frac{\sum_{b=1}^{K} D_{ab}}{D_{ab}}, \quad w_b = \frac{\alpha_b}{\sum_{b=1}^{K} \alpha_b} \quad [4, 5]$$

The fair market value $P_a$ may then be used as an improved estimate of fair market value and a floor price for selling the vehicle "a" at auction.

Figure 3:
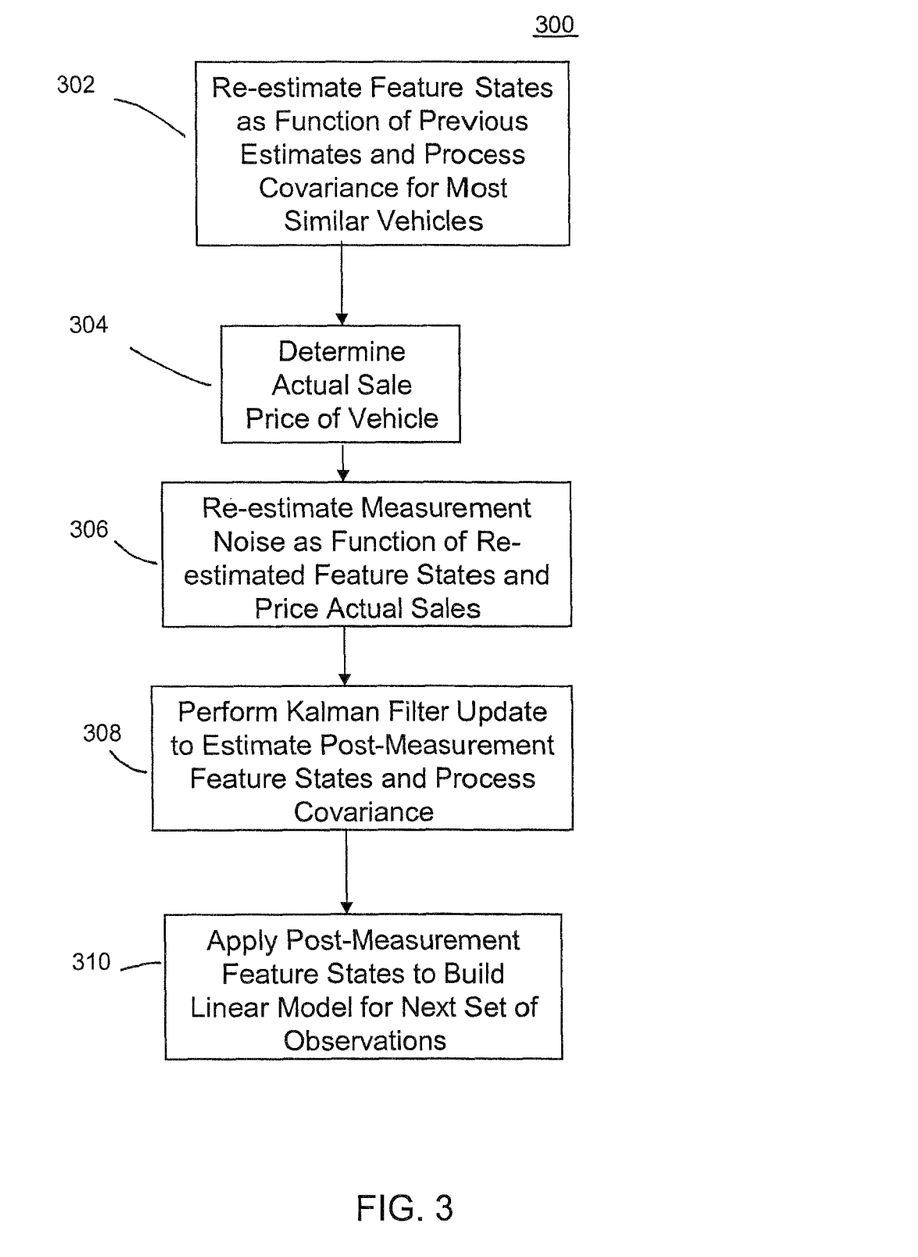
FIG. 3 presents a flow diagram illustrating a process for updating a model used to compute the fair market price according to the method depicted in FIG. 1.

An exemplary process 300 for updating the model used to compute the fair market price according to the process 200 of FIG. 2 is further illustrated by a flow diagram of FIG. 3 and the schematic diagram of FIG. 1.

The process 300 of FIG. 3 operates to track and update the system states $x_j$, independently for each vehicle segment, by applying the Kalman filter equations that operate to produce an optimal unbiased estimate of the true value of the system state $x_j$. Kalman filters are well known in the art and described in, for example, in Kalman, R. E. (1960), "A new approach to linear filtering and prediction problems," *Transactions of the American Society for Mechanical Engineering, Series D, Journal of Basic Engineering* 82, 35-45, which is incorporated by reference herein. With reference again to the process 200 of FIG. 2, it can be seen that the information pertaining to the K most similar vehicles is used first to estimate the state $x_j$ for computing the fair market value $P_a$, and then again in the process 300 of FIG. 3 to update the state $x_j$. Significantly, and as will be further illustrated below, this approach enables the Kalman filter to converge more rapidly toward an optimal estimate by more rapidly and accurately estimating the covariance of the process noise based only on vehicle information for the K most similar vehicles.

As step 302 of the process 300 depicted in FIG. 3 (and with reference to elements 103, 105 and 107 of FIG. 1), the states $x_k$ in view of a $k^{th}$ set of observations are re-estimated as a function of previously estimated states $x_{k-1}$ and a process noise vector $w_{k-1}$. The process noise vector $w_{k-1}$ is determined as a function of a process covariance $Q_{k-1}$:

$$x_k = x_{k-1} + w_{k-1}$$

$$z_{ak} = F_{ak} x_k + v_k \quad [6, 7]$$

In this case, $x_k$ represents a vector of the parameter value states of the system in view of the $k^{th}$ set of observations, and $w_{k-1}$ represents a process noise vector, or state uncertainty, acting on the system state in view of a previous set of observations. The noise vector $w_{k-1}$ is preferably modeled as normally distributed with zero mean and covariance (i.e., $(w_{k-1} \sim N(0, Q_{k-1}))$). $Q_k$ is preferably constructed as a diagonal matrix, with each element $q_{jk}$ representing the "certainty" of the parameter $x_{jk}$ in the state. If $q_{jk} = 0$, then the certainty of the system state is 100%, so that the parameter $x_{jk}$ is unchanging. If $q_{jk}$ is non-zero, the system state is uncertain, at which point the Kalman filter update will adjust the system state for $x_{jk}$ in proportion to the uncertainty and error in the value measurement.

With reference to equation [7] above and steps 304, 306 of the process 300 of FIG. 3, $z_{ak}$ represents a measured value vector of the desired car "a" at an iteration k (i.e., the actual price of the vehicle determined after its sale), where each element of the vector $z_{ak}$ is the same (i.e. equals sale price). $F_{ak}$ represents a difference matrix, in which each row represents the distances between the features of car "a" and associated features of the K-NN selected vehicles, and $v_k$ represents the measurement noise on the actual sale price with mean zero and covariance R. In this case, the measurement noise represents an estimate of the inherent uncertainty of the price of a vehicle. It can be calculated as a variance of "similar" vehicle prices over time.

It should be noted that the difference matrix $F_{ak}$ need not be maintained at a single, fixed size, but may be reduced in size to include only those columns containing non-zero distance values with reference to the K-NN selected vehicles. This reduction serves to prevent the formation of a rank-deficient matrix as would occur with a "zero column," and reduces associated processing and computation efforts required. As Applicants' experience suggests that the difference matrix $F_{ak}$ prior to such reduction in practice may be quite large and quite sparse, the benefits from size reduction are often significant.

R may be defined as a diagonal matrix, where each diagonal element of R represents a measure of the certainty with which the measured sale price reflects the true value of the vehicle. Typically, the matrix R is defined as R=rI, so that the sale of car "a" has the same uncertainty for all its K-NN comparisons. In the present example, "r" may be set to r=1000.

At steps 308 and 310 of FIG. 3 (and with reference to element 106 of FIG. 1), standard Kalman filter update equations are applied to update the linear equations (equations [1]-[5]) in view of the parameter states $x_k$. The update equations are independently applied, for example, to each of the identified segments of the vehicle population. The standard Kalman update equations are (the index to vehicle "a" is dropped):

$$P_k^- = P_{k-1} + Q_k$$

$$K_k = P_k^- F_k^T (F_k P_k^- F_k^T + R_k)^{-1}$$

$$x_k^{new} = x_k + K_k(z_k - F_k x_k)$$

$$P_k = (I - K_k F_k) P_k^- \qquad [8\text{-}11]$$

where:
$P_k^-$ represents an estimated process covariance for the $k^{th}$ set of observations,
$K_k$ represents an optimal Kalman gain for the $k^{th}$ set of observations,
$F_k^T$ is a transverse matrix corresponding to the difference matrix $F_k$ for the $k^{th}$ set of observations,
$X_k^{new}$ represents the updated state estimate based on the $k^{th}$ set of observations, and
$P_k$ represents the updated process covariance estimate based on the $k^{th}$ set of observations.
$X_k^{new}$ is may then be used as the current state estimate for calculating the floor price for a next vehicle to be sold in an associated vehicle segment.

OTHER APPLICATIONS

As describe supra herein, an exemplary embodiment of the present invention has been presented and described with reference to an auction of vehicles (automobiles) by a manufacturer. However, the present invention as claimed may be applied to a great variety of other items that are typically sold by auction. Three additional examples are briefly described to illustrate the breadth of application of the present invention.

Livestock of many types are sold at auction. Two prominent examples of auctioned livestock include "feeder cattle" and "feeder pigs," which in each case represent animals that are mature enough to be placed in a feedlot where they will be fattened prior to slaughter. See J. R. Mintert, F. K. Brazle, T. C. Schroeder, and O. Grunewald. 1988. "Factors Affecting Auction Prices of Feeder Cattle." Kansas State Univ. Coop. Ext. Serv. Bull. C-697 ("Mintert") and J. Blair, J. R. Mintert, and T. C. Schroeder. 1989. "Factors Affecting Auction Prices of Feeder Pigs."Kansas State Univ. Coop. Ext. Serv. Bull. C-703 ("Blair"), which are hereby incorporated by reference herein in their entireties. Mintert discloses for example that a number of factors of the cattle feeder lots as listed in Table II have been determined to affect auction price:

TABLE II

| Factor Name | Description |
|---|---|
| Weight | average weight of cattle in feeder lot |
| Lot Size | number of cattle in feeder lot |
| Health | measure of sickness, cleanliness, degree of physical impairment, veterinary history |
| Muscling | measure of relative level of muscle mass |
| Frame Size | measure of relative size |
| Condition | measure of relative level of mass of flesh |
| Fill | measure of relative level of non-muscle mass |
| Breed | genetic type |
| Presence of Horns | — |
| Time of Sale | relative to sale event |
| Season of Sale | — |
| Sex | — |

Mintert suggests these features can explain more than 70% of the historical variation in feeder lot prices. In addition to feeder cattle and feeder pigs, other agricultural products sold at auction may exhibit price fluctuations similarly explained by differences in product features (for example, hay lots).

Another type of item typically sold at auction is used industrial equipment. See, e.g., U.S. Patent Publication No. 2008/0027882 A1 to Allen et al. ("Allen"), entitled "Price Assessment Method For Used Equipment," which is hereby incorporated by reference herein in its entirety. Allen suggest for example that a number of factors as listed in Table III affect the auction prices for used equipment:

TABLE III

| Factor Name | Description |
|---|---|
| Serial Number | — |
| Model | — |
| Model Year | year during which production of equipment was completed |
| Equipment Type | common name and/or use for equipment |
| Equipment Manufacturer | — |
| Components | equipment configuration |
| Accessories | optional elements of equipment configuration |
| Geographic Location | — |
| Nature of use | relative assessment of degree of stress/maintenance during use |
| Hours of Operation | — |
| Condition | ranking or description of equipment state relative to an original state |
| Condition status | original, reconditioned or replaced |

One of skill in the art will readily understand that many different types of equipment may be characterized in this manner, ranging for example in scope and size from a small dental curing instrument to a complete manufacturing production line.

A third type of item which may be suitable for sale at auction are equity instruments (for example, stock instruments). For stock instruments, the "asset" being offered for sale is essentially a company, with its market valuation represented, for example, by "market capitalization" (e.g., the product of the number of outstanding shares of stock and the market price). In this case, the methods disclosed herein can be applied to construct a pricing model based on features that effect the value of the company. These features, for example, may include financial information (expressed in numerical values) extracted from quarterly reports (for example, 10-Q reports) and/or on a longer term basis, and relating for example to company revenues, debt and other liabilities, and tangible and intangible assets. This information may, for example, be expressed in financial information including return on equity (ROE), debt/equity ratio, and profit margin.

In addition, the features may include binary categorical variables like "bad/good" news, or "buy/hold/sell" ratings from different analysts, and/or other categorical variables including, for example, industry sectors (e.g., energy or technology), relevant stock market (e.g., NASDAQ or NYSE), term as a public company (e.g., greater than a specified number of years), and product mix (e.g., percent of sales associated with "commodity" products).

Once potentially relevant features are selected, associated state variables $x_j$ can be estimated and updated according for example to the processes 200, 300 herein. Possible state variables $x_j$ emerging from these processes as significant predictors could for example include $/bad news, $/revenue, $/revenue_slope_overtime, $/debt, $/earnings, $/energy_sector, and $/technology_sector. Clearly, many other possible types of sectors can be applied for company segmentation. In addition, state variables $x_j$ can could be further normalized as a function of time (e.g. $/% change_in_price_per_year).

As a result of performing the processes 200 and 300, companies with similar valuations (i.e., having stocks that behave similarly) can be identified. Groups of most similar companies can be used to form "baskets" of similar auction items, and new and more refined estimates of stock price will as a result be based on analyses directed to each basket. One might expect, for example, that large blue chip stocks will be grouped in a basket separately from stocks for smaller and more volatile companies.

In addition to these three examples, many other examples of auctionable items to which the present invention may be applied will be readily apparent to those of skill in the art. As should be evident with reference to the preferred embodiment for vehicle auctions described supra, the disclosed invention is particularly applicable to items to be sold by auction which are comparable (i.e., quite similar) to a significant number of previously-sold items sold over a short period of time, such that the assumptions on which the dynamic systems linear model created to express the state of the system are reasonably valid and the model reasonably predicts a fair market value price that is closely correlated to an actual selling price of the item.

Implementation of Method for Setting Floor Price

The disclosed method for developing the accounts collection program is particularly suitable for implementation using a computer or computer system as described in more detail below.

Figure 4:
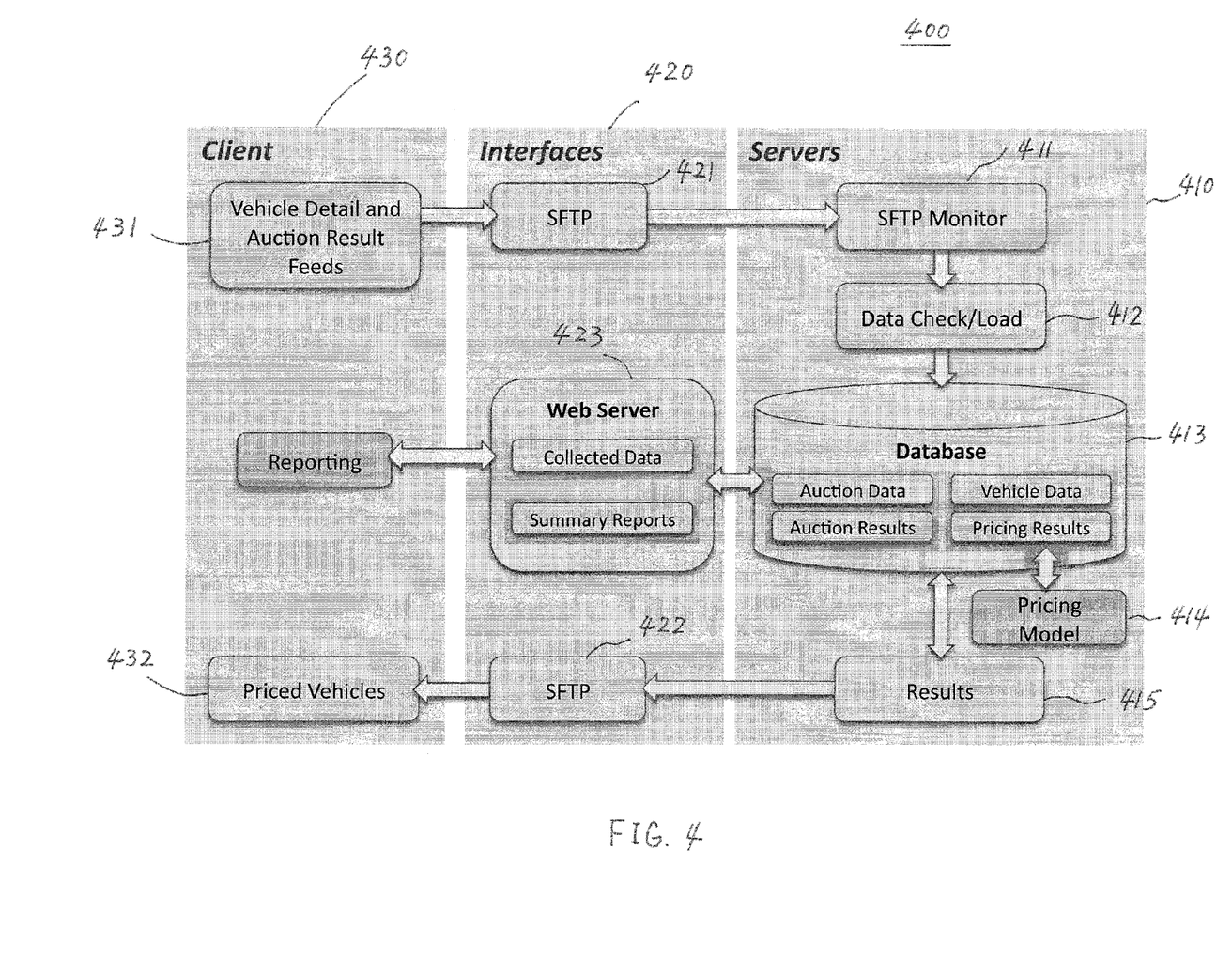
FIG. 4 presents a schematic diagram illustrating an exemplary system suitable for implementing the method of FIG. 1.

FIG. 4 shows a schematic diagram illustrating a system 400 suitable for implementing the present invention. The system 400 includes a server component 410 that interacts with client devices 430 via an interface component 420. In the system 400, vehicle data 431 including auction sales data (for example, actual sales prices) are fed by a client device 430 in an encrypted form over a secure FTP (SFTP) link 421 to a SFTP monitor 411 of a server component 410. The SFTP monitor 411 detects the arrival of the data, and decrypts and forwards the data to a data check/load component 412, which verifies the decrypted data and loads the verified data into a database 413. The database 413 may be structured, for example, to store general auction data, data relating to auction results, data pertaining to auctioned vehicles and data pertaining to the pricing models constructed according to the description provided herein. A pricing model 414, for example as previously described herein, is executed by the server component 410 to retrieve associated data from the database 413, calculate fair market value prices for vehicles at auction, and to store calculated fair market prices in the database 413. A results component 415 is configured to retrieve auction and pricing results from the database 413 (including calculated fair market prices), and to communicate this data over a SFTP link 422 to a prices vehicles storage component 432 of the client device 430.

In addition, one or more web servers 423 may be provided as part of the interface component 420 to access data from the database 413 and prepare summary reports for display on one of the client devices 430, as are described by way of example further herein.

Figure 5:
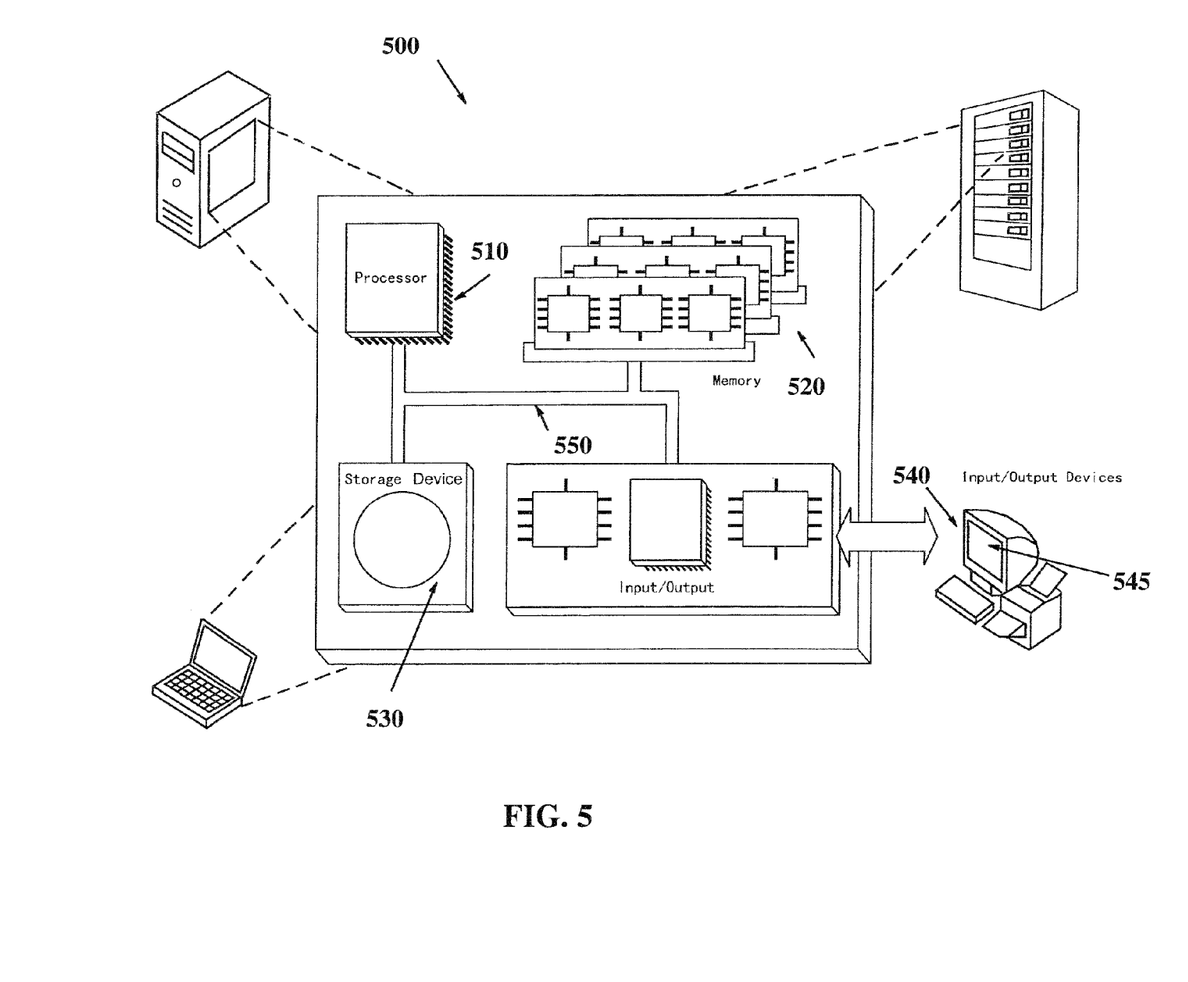
FIG. 5 presents a schematic diagram illustrating a computer system suitable for implementing server elements of the system of FIG. 4.

FIG. 5 illustrates a computer system 500 which may be used to implement one or more server elements of the system 400 (for example, including the server component 410 and the one or more web servers 423). The computer system 500 as described herein may comprise, for example, a personal computer running the WINDOWS operation system, or a server computer running LINUX or another UNIX-based operating system. The above-described methods of the present invention may be implemented on one or more computer systems 500 as stored program control instructions directed to control application software, for example, including general purpose programming environments such as Python, and database systems such as MySQL.

Computer system 500 includes a processor 510, a memory 520, a storage device 530 and input/output devices 540. One of the input/output devices 540 may include a display 545. Some or all of the components 510, 520, 530 and 540 may be interconnected by a system bus 550. Processor 510 may be single or multi-threaded, and may have one or more cores. Processor 510 executes instructions which in the disclosed embodiments of the present invention comprise steps described in one or more of FIGS. 1-3. These instructions may be stored in the memory 420, or in the storage device 530. Information may be received and output using one or more of the input/output devices 540.

The memory 520 may store information and may be a computer-readable medium, such as volatile or non-volatile memory. The storage device 530 may provide storage for the computer system 500 including for the example, the previously described database, and may be a computer-readable medium. In various aspects, the storage device 530 may be a flash memory device, a floppy disk drive, a hard disk device, and optical disk device, or a tape device.

Input devices 540 may provide input/output operations for the computer system 500. Input/output devices 540 may include a keyboard, pointing device, and microphone. Input/output devices 540 may further include a display unit for displaying graphical user interfaces, a speaker and a printer. As shown, each computer system 500 may be implemented in a desktop computer, or in a laptop computer, or in a server, typically in communication with the Internet via a local area network ("LAN," not illustrated). Alternatively, for example and with particular reference to the client devices 430 of FIG. 4, the computer system 500 may be implemented as a "smartphone" mobile communications client device 430 accessed remotely from the system 400 via a wireless link to the mobile communication device.

Figure 6A:
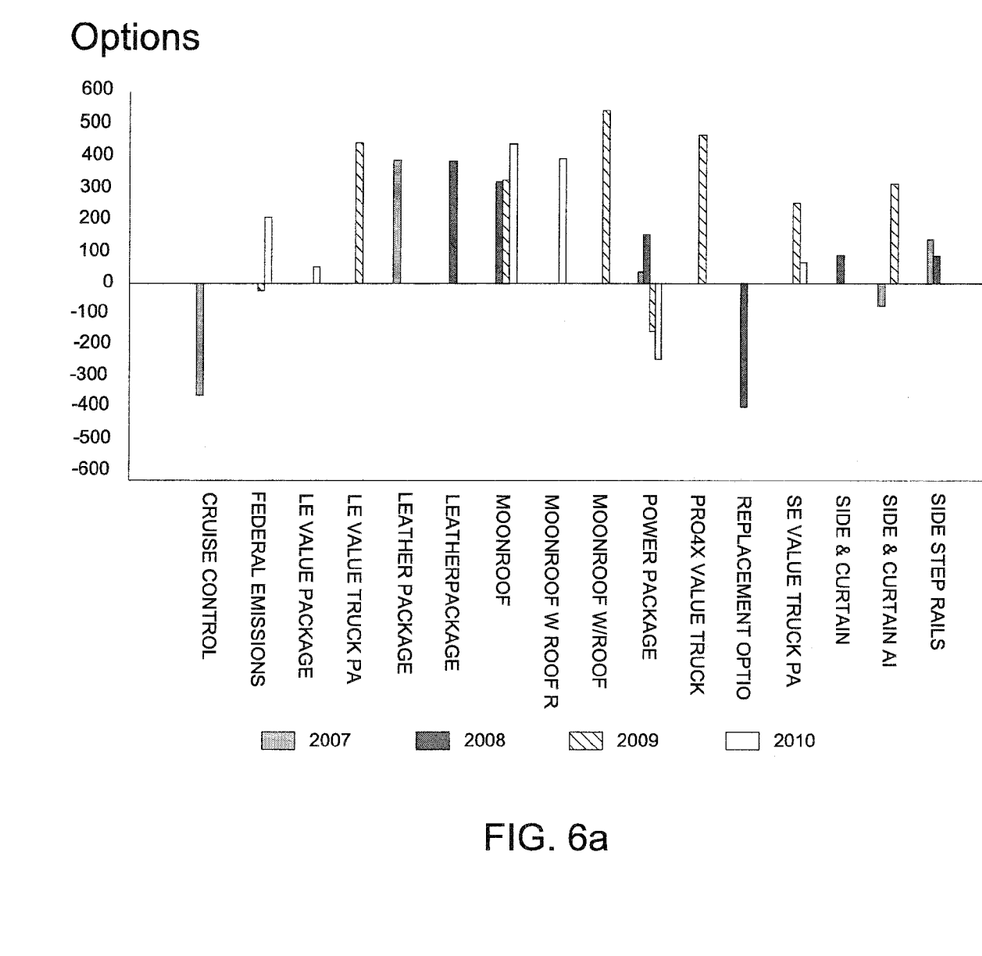
FIGS. 6a-6c illustrate portions of exemplary summary reports generated for display on a client device by the system of FIG. 4.
Figure 6B:
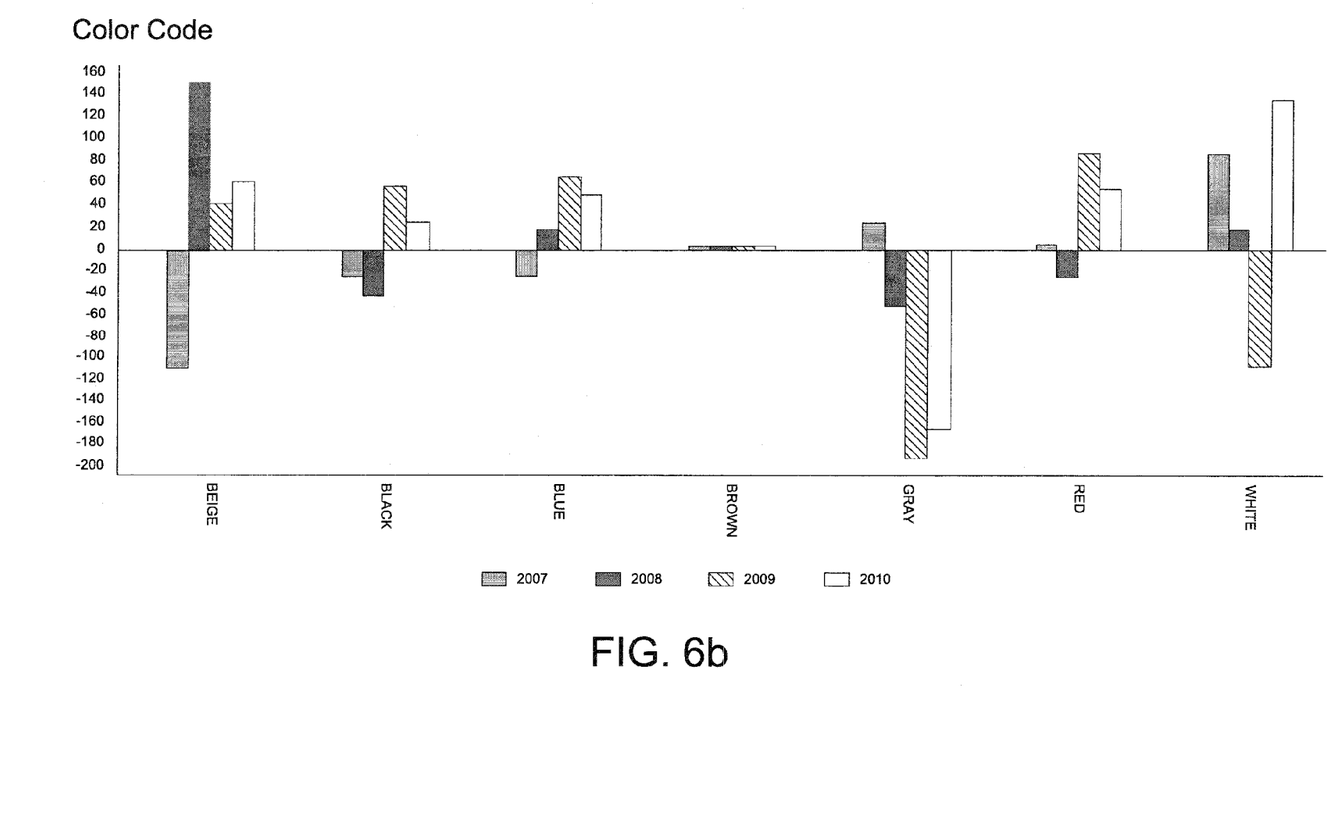
Figure 6C:
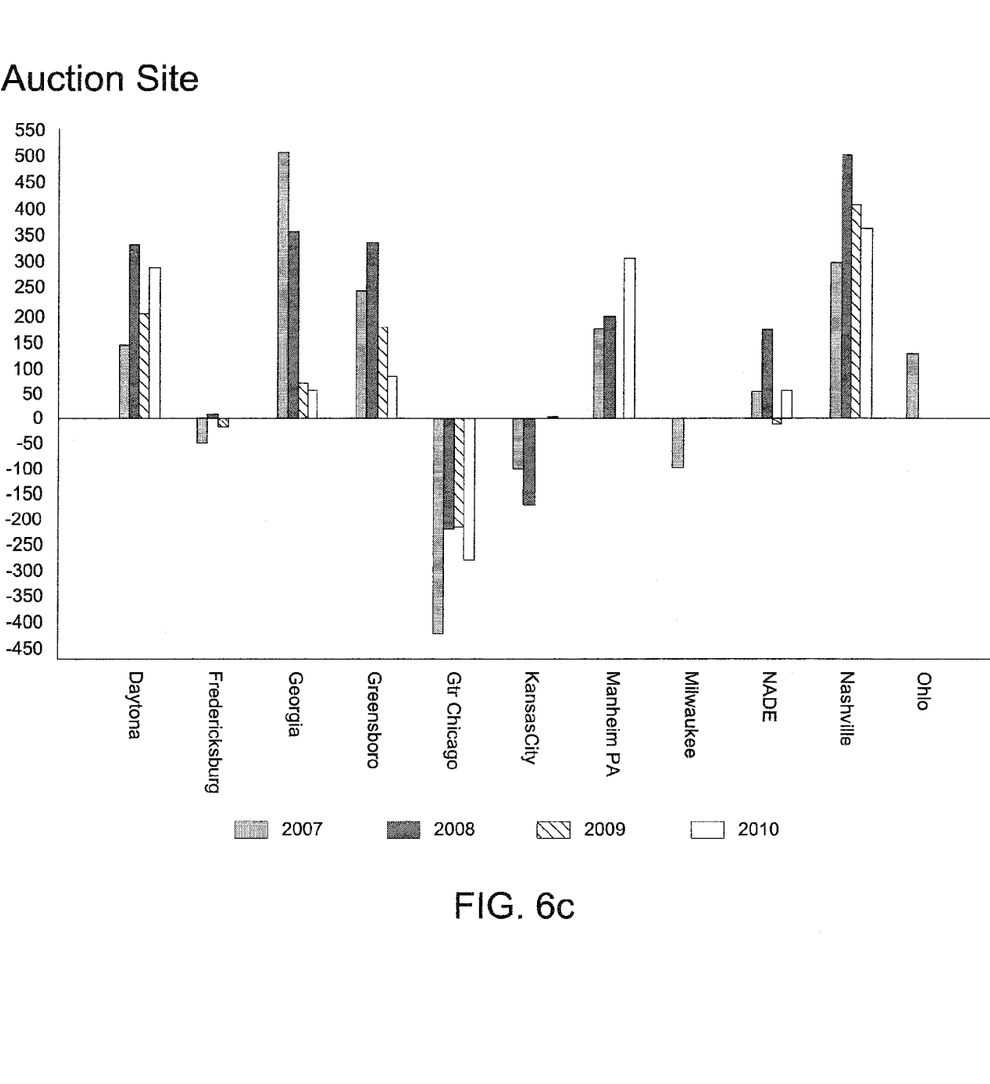

FIGS. 6a-6c illustrate exemplary portions of summary reports that may be produced by the servers 423 of FIG. 4 for display on one of the client devices 430. For example, FIG. 6a shows a portion of bar graph for display on a display screen that displays a series of differential pricing effects for a model vehicle according to individual feature options and model years of the vehicle and a reference price for the vehicle. Somewhat surprisingly, while the presence of most options individually add a differential price increase to the vehicle, the presence of some feature options (for example, "cruise control" and a "power package" in some cases) may cause the fair market price to decrease.

FIG. 6b shows a portion of bar graph for display on a display screen that displays a series of differential pricing effects according to different model years of the vehicle and associated vehicle colors. Finally, FIG. 6c shows a portion of bar graph for display on a display screen that displays a series of differential pricing effects according to different geographic sites. In accordance with principles of the present invention, it will be readily apparent to one of skill in the art that the web servers 423 of FIG. 4 can be configured to provide many other reports based on the data stored by the database 413 of FIG. 4.

CONCLUSION

It should of course, be understood that while the present invention has been described with respect to disclosed embodiments, numerous variations are possible without departing from the spirit and scope of the present invention as defined in the claims. For example, the present invention may be applied as a means for establishing fair market value for members of a population of homes, hotel rooms and many other items having quantifiable features that can be compared for the purpose of establishing a fair market value for a representative one of the items. Moreover, it is intended that the scope of the present invention include all foreseeable equivalents to the elements and structures as described herein and with reference to the drawing figures. Accordingly, the invention is to be limited only by the scope of the claims and their equivalents.

We claim:

1. A computer-implemented method for setting a reserve price for an item to be sold at auction, the method performed on a server and comprising steps of:
    identifying by the server a plurality of features for evaluating predicted price differentials between the item to be sold and items in a set of comparative items that were previously sold;
    evaluating by the server the predicted price differentials between the item to be sold and the items in the set of comparative items based on estimated values of state variables for the monetary value of the plurality of item features;
    calculating by the server values of a distance metric representing distances between the item to be sold and items in the set of comparative items, each calculated distance value indicating a degree of similarity between the item to be sold and a respective item in the set of comparative items;
    selecting by the server a subset of most similar items from the set of comparative items according to the calculated distances;
    calculating by the server a weighting function for each item in the subset of most similar items;
    estimating by the server the reserve price for the item to be sold as a function of the weighting functions and price differentials for the subset of most similar items;
    transmitting by the server the reserve price over a secure link to a client device;
    updating by the server the estimated values of state variables as a function of an actual sales price for the item to be sold and a current estimate of uncertainty for the estimated values of state variables, wherein the estimated values of state variables are updated by application of a Kalman filter; and
    storing the updated values of state variables in a database of the server.

2. The computer-implemented method of claim 1, wherein the item to be sold and the comparative items comprise vehicles.

3. The computer-implemented method of claim 2, wherein the vehicles comprise automobiles.

4. The computer-implemented method of claim 2, further comprising the step of: selecting items for the set of comparative items as vehicles sharing at least one of the plurality of features in common with a vehicle to be sold, the at least one feature including at least one of vehicle model and vehicle year of manufacture.

5. The computer-implemented method of claim 1, wherein the item to be sold and the comparative items comprise industrial equipment.

6. The computer-implemented method of claim 1, wherein the item to be sold and the comparative items comprise livestock lots.

7. The computer-implemented method of claim 1, wherein the item to be sold and the comparative items comprises real properties.

8. The computer-implemented method of claim 7, wherein the real properties comprise residential dwellings.

9. The computer-implemented method of claim 1, wherein the item to be sold and the comparative items comprise equity instruments.

10. The computer-implemented method of claim 1, wherein the equity instruments comprise stocks.

11. The computer-implemented method of claim 1, wherein the weighting function is calculated as an inverse function of the calculated distance value for the respective item.

12. The computer-implemented method of claim 11, wherein values of the distance metric calculated for the item to be sold and each item in the set of comparative items are each computed as a function of absolute values of the predicted price differentials between the item to be sold and a respective item in the set of comparative items for each of the plurality of features.

13. The computer-implemented method of claim 12, wherein each item in the subset of most similar items is selected as having a calculated distance value in relation to the item to be sold that is less than a predetermined threshold value.

14. The computer-implemented method of claim 12, wherein a predetermined number of items are selected in the subset of most similar items, in a rank order proceeding from a lowest calculated distance value toward a highest calculated distance value.

15. The computer program product of claim 14, wherein the weighting function is calculated as an inverse function of the calculated distance for the respective item.

16. The computer program product of claim 15, wherein values of the distance metric calculated for the item to be sold and each item in the set of comparative items are each computed as a function of absolute values of the predicted price differentials between the item to be sold and a respective item in the set of comparative items for each of the plurality of features.

17. The computer program product of claim 15, wherein the reserve price is estimated by a linear model that combines the price differentials for the subset of most similar items proportionately according to the weighting functions for the items in the subset of most similar items.

18. The computer-implemented method of claim 11, wherein the reserve price is estimated by a linear model that combines the price differentials for the subset of most similar items proportionately according to the weighting functions for the items in the subset of most similar items.

19. The computer-implemented method of claim 1, wherein the plurality of features for quantifying predicted price differentials are selectively identified by a seller of the item to be sold.

20. The computer-implemented method of claim 1, further comprising the steps of:
    receiving a request transmitted by a web server for data relating to the price differentials; and
    transmitting the requested date to the web server.

21. A computer program product, comprising a non-transitory computer-usable storage medium having computer-readable instructions embodied therein, the computer-readable program code adapted to be executed by a server to implement a method for setting a reserve price for an item to be sold at auction, the method comprising the steps of:
    identifying a plurality of features for evaluating predicted price differentials between the item to be sold and items in a set of comparative items that were previously sold;
    evaluating the predicted price differentials between the item to be sold and the items in the set of comparative items based on estimated values of state variables for the plurality of features;
    calculating values of a distance metric representing distances between the item to be sold and items in the set of comparative items, each calculated distance value indicating a degree of similarity between the item to be sold and a respective item in the set of comparative items;
    selecting a subset of most similar items from the set of comparative items according to the calculated distances;
    calculating a weighting function for each item in the subset of most similar items;
    estimating the reserve price for the item to be sold as a function of the weighting functions and price differentials for the subset of most similar items;
    transmitting the reserve price over a secure link to a client device
    updating the estimated values of state variables as a function of an actual sales price for the item to be sold and a current estimate of uncertainty for the estimated values of state variables, wherein the estimated values of state variables are updated by application of a Kalman filter; and
    storing the updated values of state variables in a database of the server.

22. The computer program product of claim 21, wherein the item to be sold and the comparative items comprise vehicles.

23. The computer program product of claim 22, further comprising the step of:
    selecting items for the set of comparative items as vehicles sharing at least one of the plurality of features in common with the vehicle to be sold, the at least one feature including at least one of vehicle model and vehicle year of manufacture.

24. The computer program product of claim 21, wherein the item to be sold and comparative items comprise industrial equipment.

25. The computer program product of claim 21, wherein the item to be sold and the comparative items comprise livestock lots.

26. The computer program product of claim 21, wherein the item to be sold and the comparative items comprises real properties.

27. The computer program product of claim 26, wherein the real properties comprise residential dwellings.

28. The computer program product of claim 21, wherein the item to be sold and the comparative items comprise equity instruments.

29. The computer program product of claim 28, wherein the equity instruments comprise stocks.

* * * * *